(12) United States Patent
Quaade et al.

(10) Patent No.: US 12,730,330 B2
(45) Date of Patent: Sep. 8, 2026

(54) COLLIMATOR ARRAY AND FANOUT ARRAY

(71) Applicant: NIL Technology ApS, Kongens Lyngby (DK)

(72) Inventors: Ulrich Quaade, Bagsvaerd (DK); Olivier Francois, Kongens Lyngby (DK); Yuriy Elesin, Copenhagen (DK); Villads Egede Johansen, Copenhagen (DK)

(73) Assignee: NIL Technology ApS, Kongens Lyngby (DK)

( * ) Notice: Subject to any disclaimer, the term of this patent is extended or adjusted under 35 U.S.C. 154(b) by 267 days.

(21) Appl. No.: 18/289,167

(22) PCT Filed: Apr. 8, 2022

(86) PCT No.: PCT/EP2022/061341
§ 371 (c)(1),
(2) Date: Nov. 1, 2023

(87) PCT Pub. No.: WO2022/233703
PCT Pub. Date: Nov. 10, 2022

(65) Prior Publication Data

US 2024/0219741 A1 Jul. 4, 2024

Related U.S. Application Data

(60) Provisional application No. 63/183,881, filed on May 4, 2021.

(51) Int. Cl.
*G02B 27/30* (2006.01)
*G02B 27/42* (2006.01)

(52) U.S. Cl.
CPC ............ *G02B 27/30* (2013.01); *G02B 27/42* (2013.01)

(58) Field of Classification Search
CPC ........ G02B 27/20; G02B 27/30; G02B 27/42; G02B 27/425; G02B 27/46; G02B 27/48;
(Continued)

(56) References Cited

U.S. PATENT DOCUMENTS 9,465,227 B2 10/2016 Popovich et al.
10,048,504 B2 * 8/2018 Herschbach ....... G02B 27/0961
(Continued)

FOREIGN PATENT DOCUMENTS

CN 106990660 7/2017
CN 107589623 1/2018
(Continued)

OTHER PUBLICATIONS

International Search Report and Written Opinion in International Appln. No. PCT/EP2022/061341, mailed on Jul. 29, 2022, 12 pages.
(Continued)

*Primary Examiner* — Jie Lei
(74) *Attorney, Agent, or Firm* — Fish & Richardson P.C.

(57) ABSTRACT

Structured light generating modules and systems are described. An example structured light generating module includes an array of discrete light sources, an array of discrete fanout elements, and an array of discrete collimator elements interposed between the array of discrete light sources and the array of discrete fanout elements. Each of the discrete collimator elements within the array of discrete collimator elements is aligned to a respective discrete light source within the array of discrete light sources. Each of the fanout elements within the array of discrete fanout elements is aligned to a respective discrete collimator element within the array of discrete collimator elements. Each of the respectively aligned discrete light sources, collimator elements, and fanout elements is configured to generate a unit-cell structured light illumination comprising one or more indi-
(Continued)

vidual illumination features over at least a portion of a field of illumination of the structured light generating module, wherein one or more of the unit-cell structured light illuminations collectively are a structured light illumination.

20 Claims, 9 Drawing Sheets

(58) Field of Classification Search

CPC ........ G02B 27/12; G02B 27/126; G02B 6/34; G02B 6/124; G02B 6/02085; G02B 6/12007; G02F 1/13342; G02F 1/0147; G02F 1/292; G02F 1/13471; G02F 1/134309

USPC ....... 359/641, 618, 457, 455, 566, 565, 563, 359/558, 197

See application file for complete search history.

(56) References Cited

U.S. PATENT DOCUMENTS

| | | | | |
|---|---|---|---|---|
| 2018/0213207 | A1 | 7/2018 | Wilson et al. | |
| 2019/0058871 | A1 * | 2/2019 | Han | G01B 11/25 |
| 2019/0178635 | A1 | 6/2019 | Ge et al. | |
| 2019/0319430 | A1 | 10/2019 | Na et al. | |
| 2020/0251882 | A1 | 8/2020 | Lyon et al. | |

FOREIGN PATENT DOCUMENTS

| | | |
|---|---|---|
| CN | 108493767 | 9/2018 |
| CN | 108594453 | 9/2018 |
| EP | 3742564 | 11/2020 |
| WO | WO 2011/021140 | 2/2011 |
| WO | WO 2014/102341 | 7/2014 |
| WO | WO 2016/122404 | 8/2016 |
| WO | WO 2017/131585 | 8/2017 |
| WO | WO 2020/245397 | 12/2020 |
| WO | WO 2021/250113 | 12/2021 |

OTHER PUBLICATIONS

International Preliminary Report on Patentability in International Appln. No. PCT/EP2022/061341, mailed on Nov. 16, 2023, 7 pages.

* cited by examiner 350
132
236
132
130
124
216B
216A
224A
230A
310

350
132
240
236
132

COLLIMATOR ARRAY AND FANOUT ARRAY

CROSS-REFERENCE TO RELATED APPLICATIONS

This application is a National Stage application under 35 U.S.C. § 371 of International Application No. PCT/EP2022/061341, filed on Apr. 28, 2022, which claims the benefit of priority from U.S. Provisional Patent Application No. 63/183,881, filed on May 4, 2021, the contents and disclosures of which are incorporated herein by reference in their entirety.

FIELD OF THE DISCLOSURE

The present disclosure relates to arrays of optical elements and their incorporation into structured light generating modules.

BACKGROUND

Structured light generating modules are configured to illuminate objects within a field of illumination with a structured light illumination (e.g., regular or random patterns, or texture). Structured light generating modules can be used in combination with light-sensitive components, such as cameras with image sensors, or specially configured pixels to generate object information (e.g., proximity information, distance ranging, or three-dimensional data) of the illuminated objects.

In some instances, it can be an advantage to integrate an array of light sources into a structured light generating module. However, it can be a challenge to design optical elements, aligned with the array of light sources, to generate a structured light illumination without significant distortion as the optical elements are off axis with respect to the array of light sources.

Moreover, in some instances, an object illuminated by a structured light generating module may only occupy a portion of the structured light generating module's field of illumination. Consequently, power used to generate the structured light illumination which is not incident on the object is wasted.

SUMMARY

The present disclosure describes structured light illumination modules and systems configured, in some implementations, to generate distortion-free structured light illuminations and/or that are configurable to illuminate only a portion of a field of illumination with a structure light pattern. In some implementations, a structured light illumination module includes an array of discrete light sources, an array of discrete fanout elements, and an array of discrete collimator elements interposed therebetween. Each of the discrete collimator elements within the array of discrete collimator elements is aligned to a respective discrete light source within the array of discrete light sources. Each of the fanout elements within the array of discrete fanout elements is aligned to a respective discrete collimator element within the array of discrete collimator elements. Each of the respectively aligned discrete light sources, collimator elements, and fanout elements is configured to generate a unit-cell structured light illumination comprising one or more individual illumination features over at least a portion of a field of illumination of the structured light generating module, one or more of the unit-cell structured light illuminations collectively being a structure light illumination.

In some implementations, each of the discrete collimator elements is a meta-optical element and/or a diffractive optical element. In some implementations, each of the discrete fanout elements is a meta-optical element and/or a diffractive optical element configured to generate one or more diffraction orders corresponding to one or more individual illuminations within the unit-cell structured light illumination.

In some implementations, power to one or more of the discrete light sources within the array of light sources is regulated such that the structured light illumination only illuminates a portion of the field of illumination. In some implementations, each discrete light source with the array of light sources is a vertical-cavity surface-emitting laser.

The present disclosure further describes systems including a structured light generating module and an array of light-sensitive components wherein such a system is configured to collect light reflected from an object illuminated by the structured light illumination.

In some implementations, the power to one or more of the discrete light sources within the array of light sources is regulated such that the structured light illumination only illuminates the object within the field of illumination.

In some implementations, a structure light generating module further includes a supplemental light source, a supplemental fanout element, and a supplemental collimator element interposed therebetween such that the supplemental collimator element is aligned to the supplemental light source and the supplemental fanout element is aligned with the supplemental collimator element.

In some implementations, the aligned supplemental light source, supplemental collimator element, and supplemental fanout element are configured to generate a supplemental structured light illumination comprising one or more individual illumination features over at least a portion of the field of illumination.

In some implementations, each discrete fanout element within the array of fanout elements is mounted onto a common substrate and/or is composed of the same material as the other discrete fanout elements within the array of discrete fanout elements. In some implementations, each discrete collimator element within the array of collimator elements is mounted onto a common substrate and/or is composed of the same material as the other discrete collimator elements within the array of discrete collimator elements.

Other aspects, features and advantages will be apparent form the following detailed description, the accompanying drawings, and the claims.

DETAILED DESCRIPTION

Figure 1A:
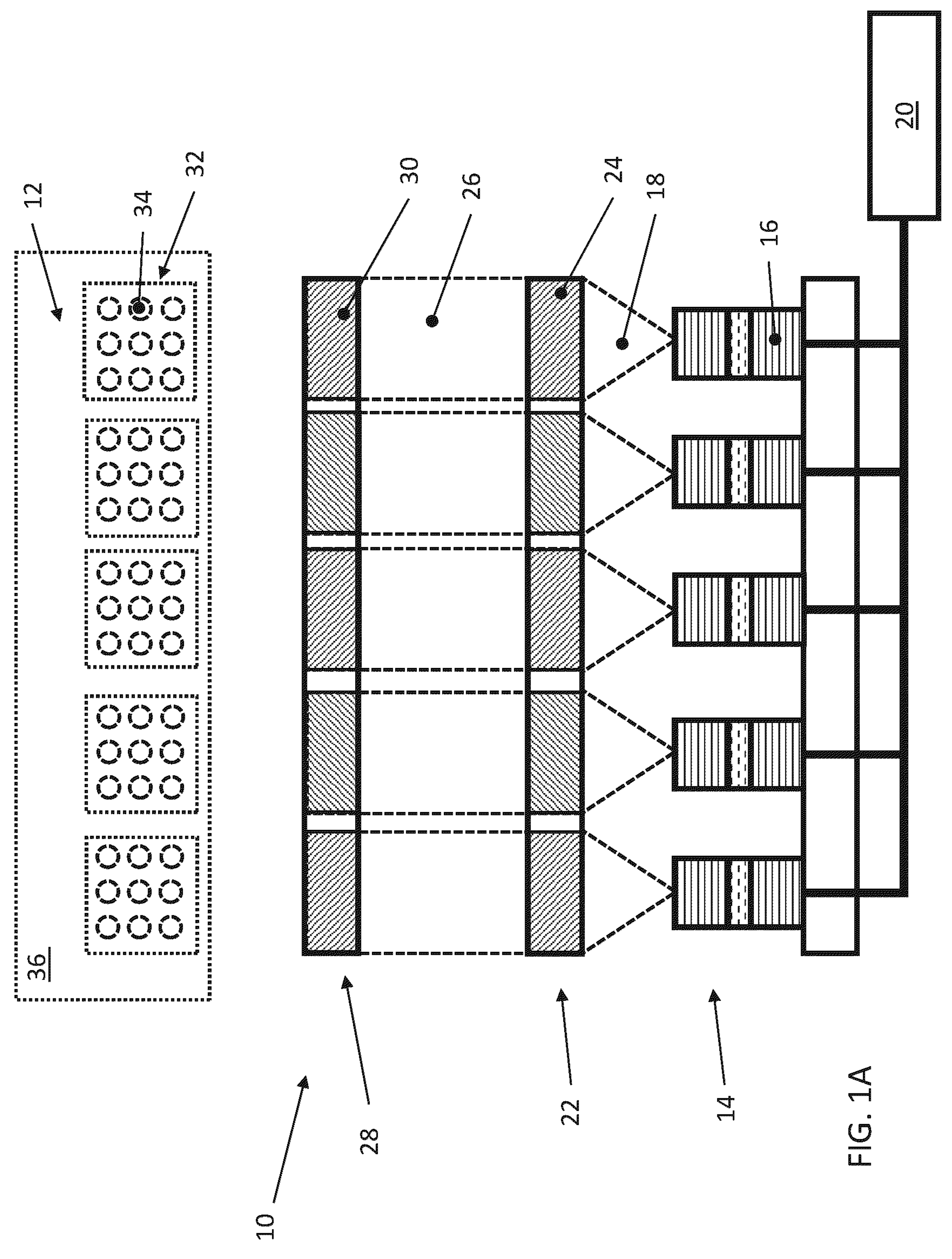
FIGS. 1A-1B depict an example structured light illumination module.

FIG. 1A depicts a structured light generating module 10 configured to generate a structured light illumination 12 in the far field. The structured light generating module 10 includes an array 14 of discrete light sources 16. Each light source 16 within the array 14 is configured to generate a light emission 18 (depicted with dashed lines). The array 14 of discrete light sources is configured such that one or more of the light sources 16 are addressable (e.g., via a controller 20 communicatively coupled to each discrete light source in the array). That is, one or more of the light sources 16 can be controlled such that its emission 18 can be regulated (e.g., turned on, off, temporally modulated or altered in some other way such as altering its polarization, wavelength, and so forth). The light sources 16 may be lasers (e.g., vertical-cavity surface emitting lasers) or other suitable light-emitting devices (e.g., light-emitting diodes).

The structured light generating module 10 further includes an array 22 of discrete collimator elements and an array 28 of discrete fanout elements. Each discrete collimator element 24 within the array 22 of collimator elements is aligned with (and designed to) one or more of the discrete light sources 16. Each collimator element 24 is configured to collimate the light emission (collimated emission 26 depicted with dashed lines) generated by a corresponding light source 16 to which it is aligned. The collimator elements 24 may be, for example, diffractive optical elements, refractive optical elements, or meta-optical elements. Each discrete fanout element 30 within the array 28 of fanout elements is aligned with (and designed to) one or more of the discrete collimator elements 24. Each fanout element 30 is configured to generate, from a corresponding incident collimated emission 26, a unit-cell structured light illumination 32. Each unit-cell structured light illumination 32 corresponds to a portion of the structured light illumination 12 generated in the far field. Each unit-cell structured light illumination 32 consists of an array of discrete individual illumination features 34. The fanout elements 30 may be, for example, diffractive optical elements or meta-optical elements.

In some instances, a discrete fanout element 30 can be configured to generate individual illumination features 34 from one or more diffraction orders. In some instances, meta-optical elements may be used to generate particularly small angular separation between individual illumination features 34. The illumination features 34 may be regular (as in a grid-like pattern) or may exhibit a high degree of randomness. In the exampled depicted in FIG. 1A, each fanout element 30 is configured to diffract three diffraction orders in x and y which generate nine individual illumination features in its corresponding unit-cell structured light illumination 32. In the example depicted in FIG. 1A, all the discrete light sources 16 are turned on such that their corresponding collimator and fanout elements 24, 30 are illuminated so as to generate a respective unit-cell structured light illumination 32 in a portion of the field of illumination 36. Collectively, their unit-cell structured light illuminations 32 span the entire field of illumination 36. This mode of operation can be useful, for example, when power is not a concern, or when objects substantially fill the field of illumination 36.

Figure 1B:
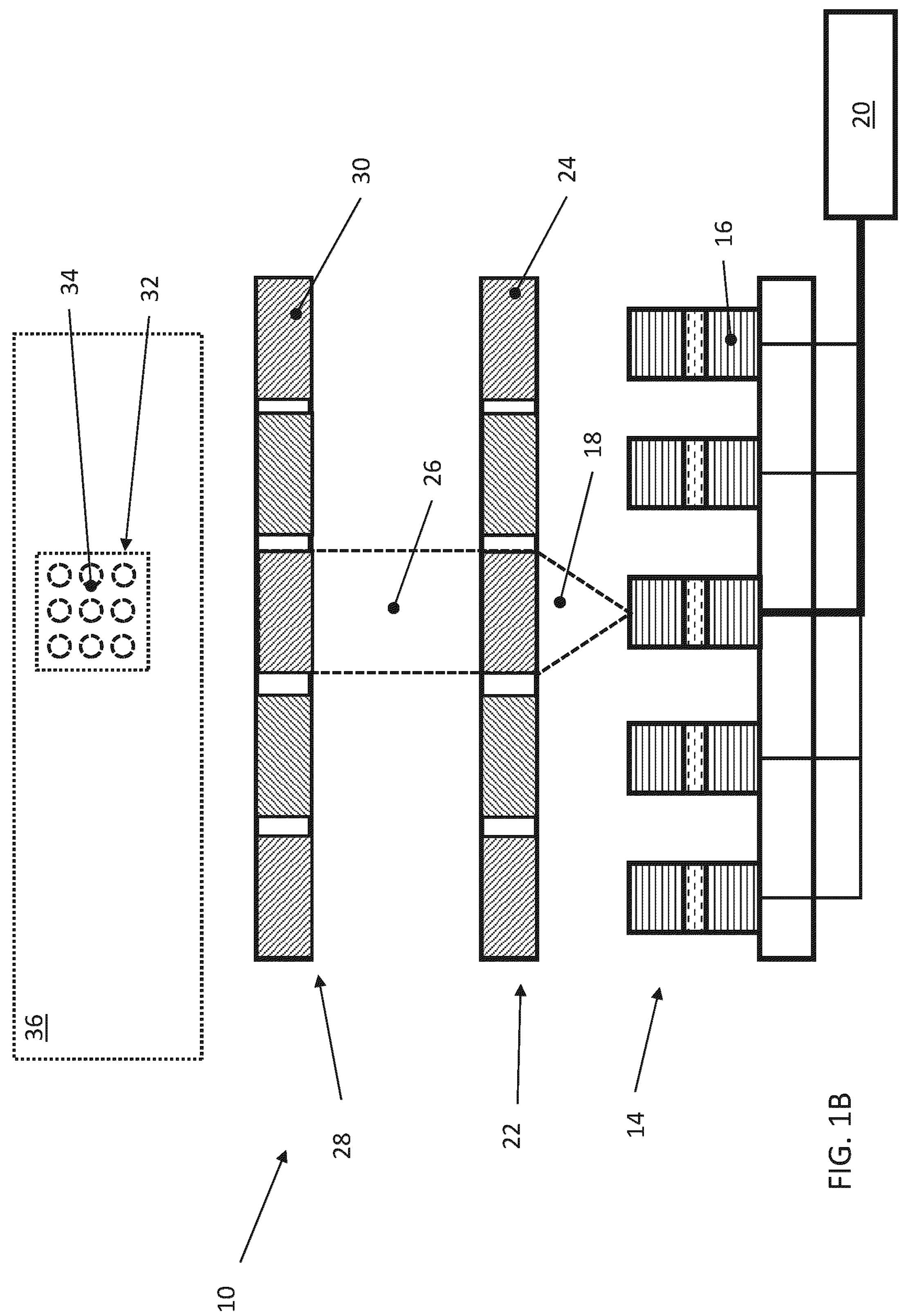

FIG. 1B depicts the same example structured light illumination module 10 as described above in connection with FIG. 1A. However, some of the discrete light sources 16 are turned off such that only one discrete light source illuminates its corresponding collimator element 24 and fanout element 30. Consequently, only one unit-cell structured light illumination 32 is generated in the field of illumination 36. This mode of operation can be useful, for example, in a low-power mode and/or where an object or object only partially fills the field of illumination 36.

Figure 2A:
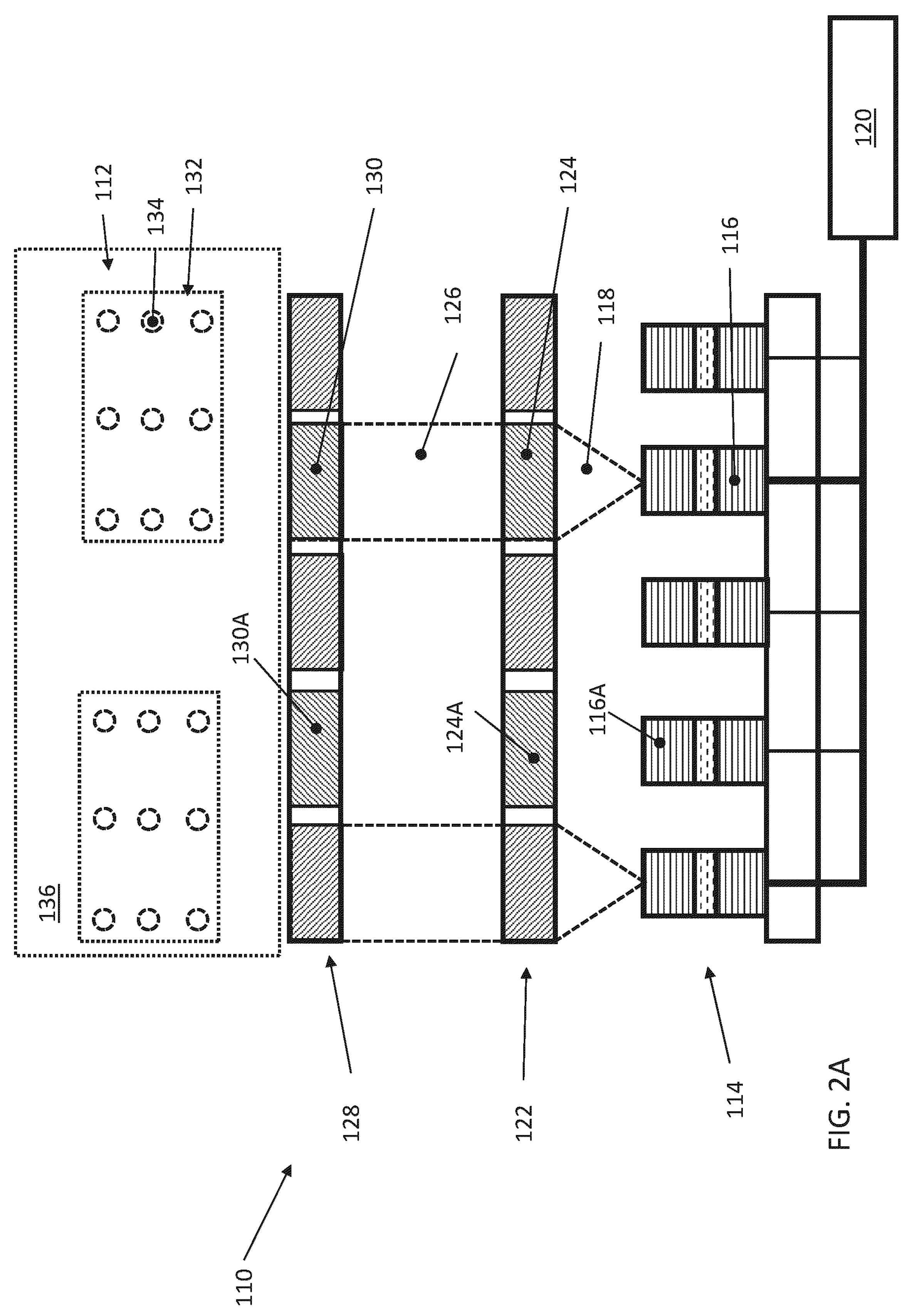
FIGS. 2A-2C depict another example structured light illumination module.
Figure 2B:
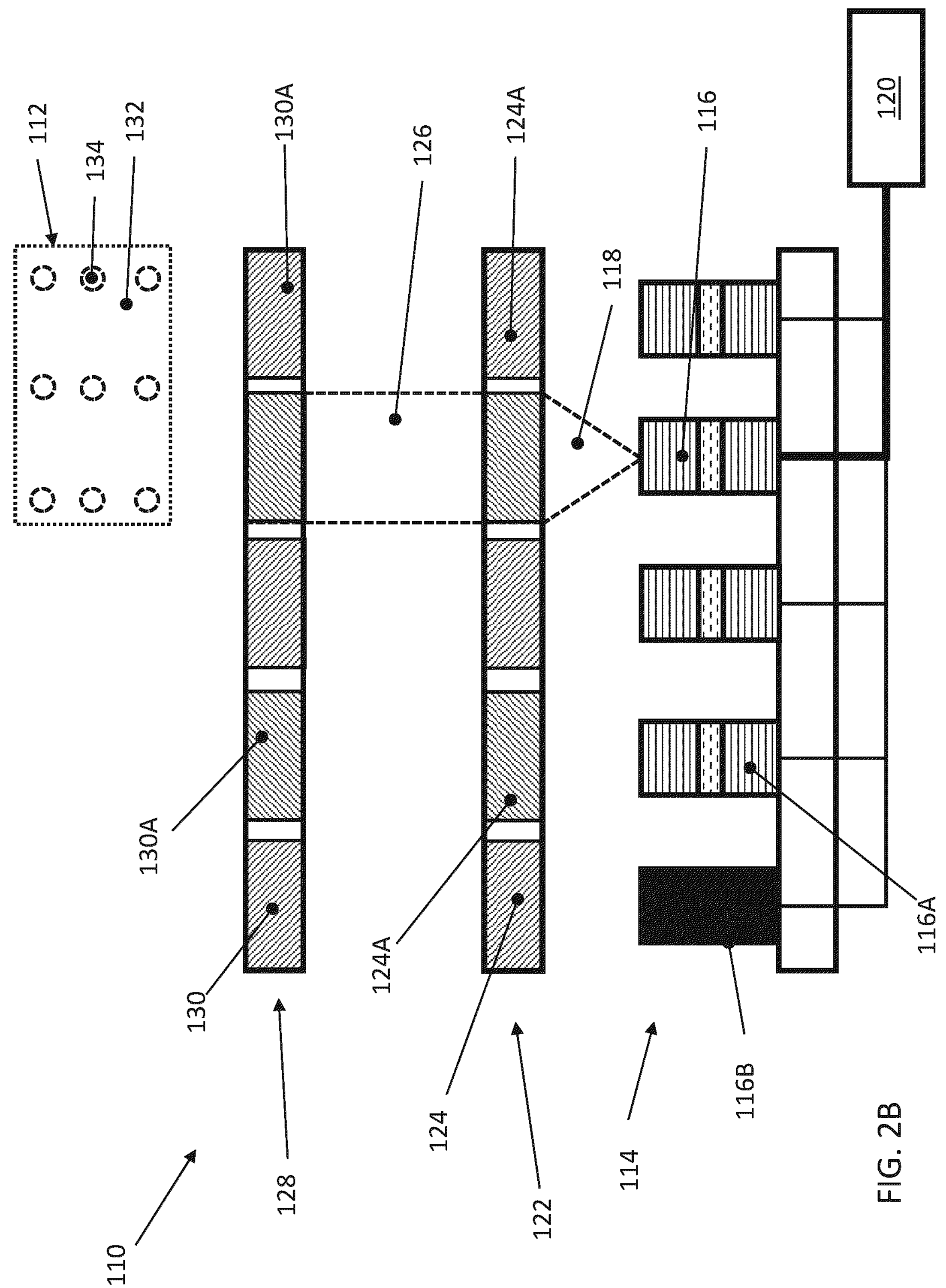
Figure 2C:
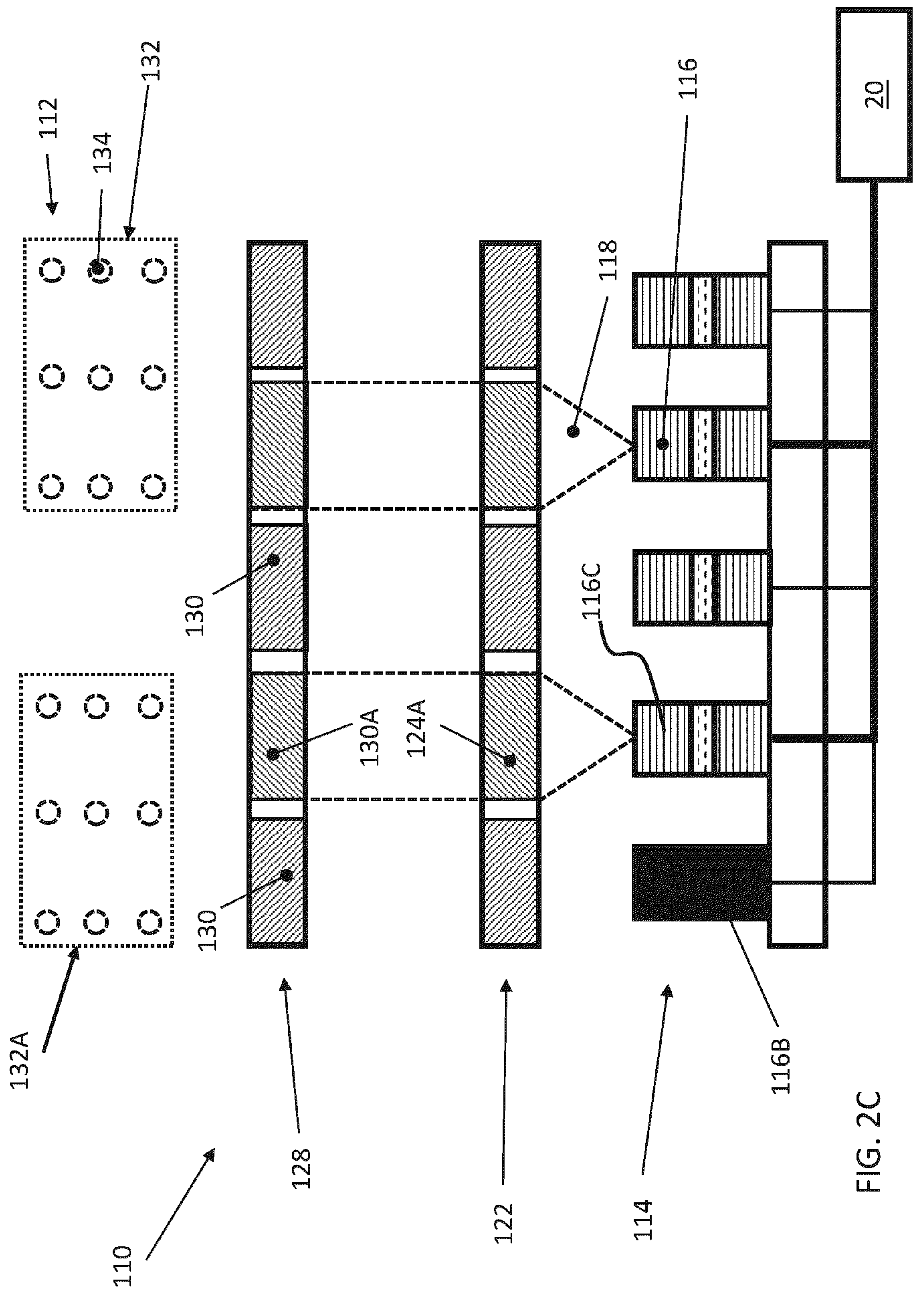

FIGS. 2A-2C depict another example structured light generating module 110. The module 110 includes an array 114 of discrete light sources 116 (producing corresponding light emission 118), an array 122 of discrete collimator elements 124 (producing corresponding collimated emission 126), and an array 128 of discrete fanout elements 130 as described in connection with the example module depicted in FIGS. 1A and 1B. However, the array 114 of discrete light sources includes one or more supplemental light-sources 116A, the array 122 of collimator elements 124 includes one or more supplemental collimator elements 124A, and the array 128 of fanout elements includes one or more supplemental fanout elements 130A. Each supplemental light source 116A, corresponding supplemental collimator element 124A, and corresponding supplemental fanout element 130A are respectively aligned and are collectively configured to replicate the unit-cell structured light illumination 132 generated from another (e.g., adjacent) light source with its corresponding collimator element and corresponding fanout element. The module 110 can produce structured light illumination 112 in a field of illumination 136. The structured light illumination 112 can be composed of unit-cell illuminations 132 made up of individual illumination features 134. The array 114 of discrete light sources is configured such that one or more of the light sources 116 are addressable (e.g., via a controller 120 communicatively coupled to each discrete light source in the array). That is, one or more of the light sources 116 can be controlled such that its emission 118 can be regulated (e.g., turned on, off, temporally modulated or altered in some other way such as altering its polarization, wavelength, and so forth). The light sources 116 may be lasers (e.g., vertical-cavity surface emitting lasers) or other suitable light-emitting devices (e.g., light-emitting diodes).

FIG. 2B depicts the example structured light generating module 110 where one of the discrete light sources (e.g., 116B) is non-functioning. The corresponding unit-cell structured light illumination 132 therefore no longer is generated and a void in the structured light illumination 112 becomes apparent. Such a void could cause be problematic when collecting or compiling object data, such as three-dimensional data of objects within the field of illumination.

FIG. 2C depicts the example structured light generating module 110 where an adjacent supplemental light source (e.g., 116C) is powered on such that together with its corresponding supplemental collimator element 124A and corresponding supplemental fanout element 130A generates a unit-cell structured light illumination 132A to fill the void in the structured light illumination to overcome some of the problems mentioned above.

Figure 3A:
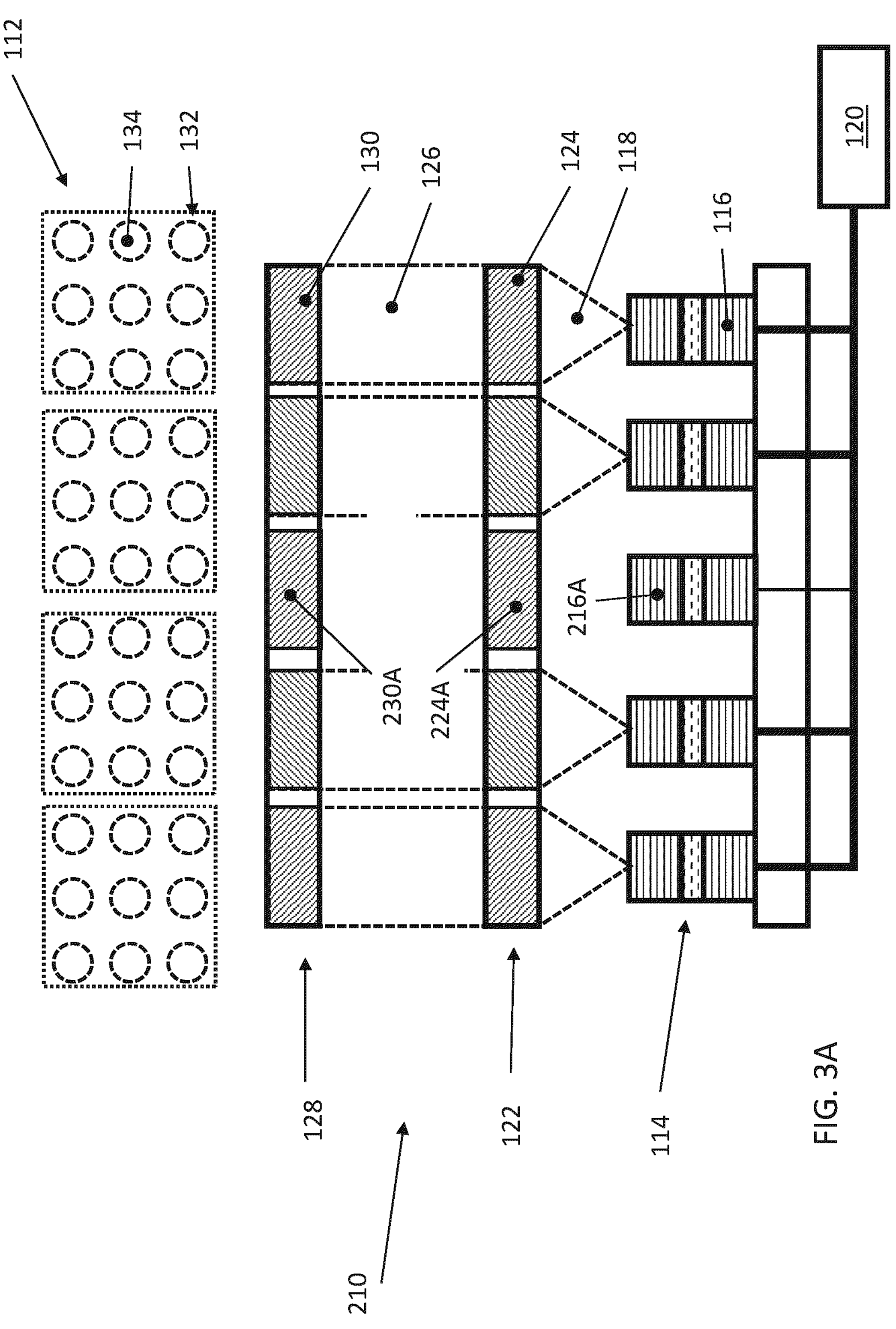
FIGS. 3A-3C depicts yet another example structured light illumination module.
Figure 3B:
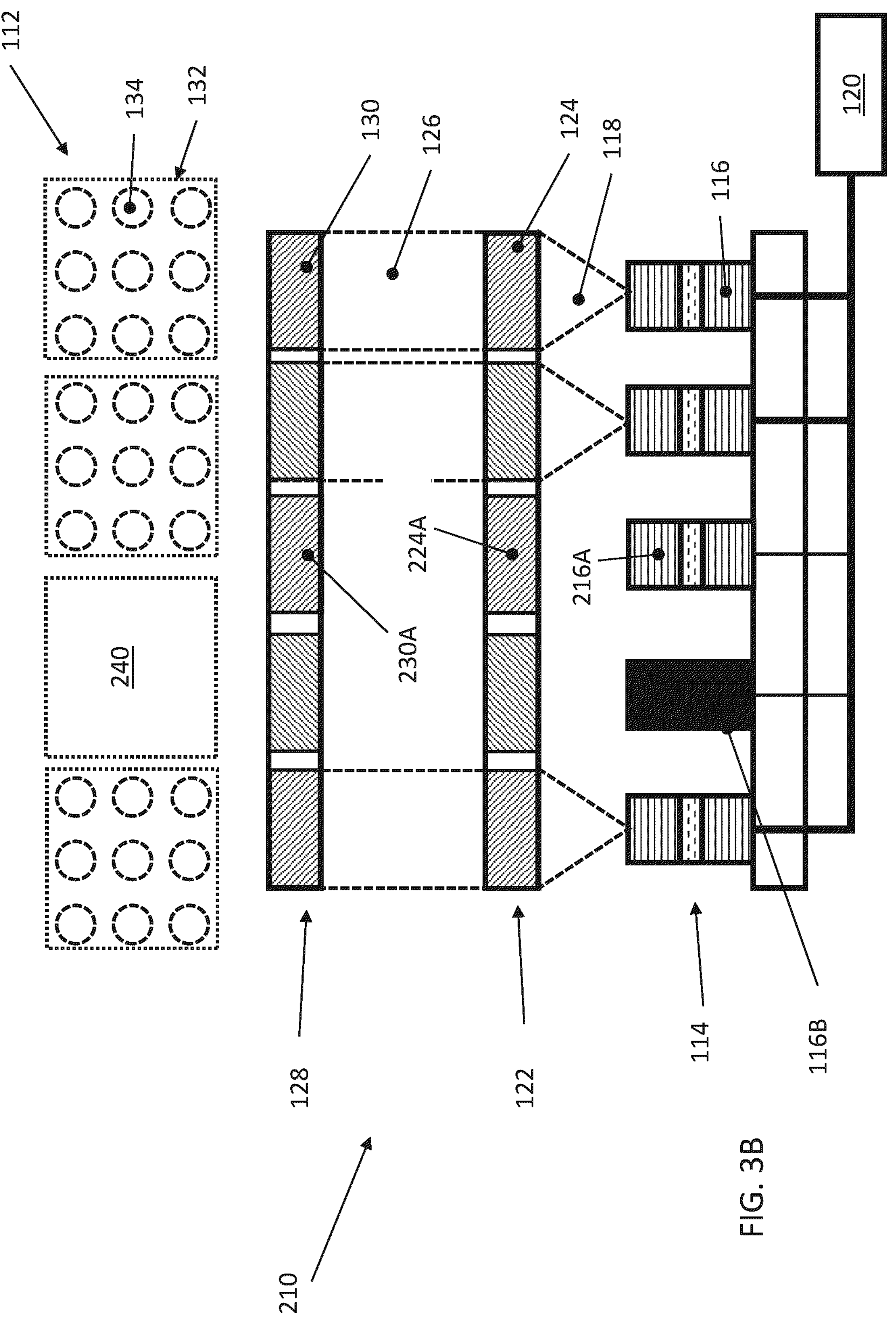
Figure 3C:
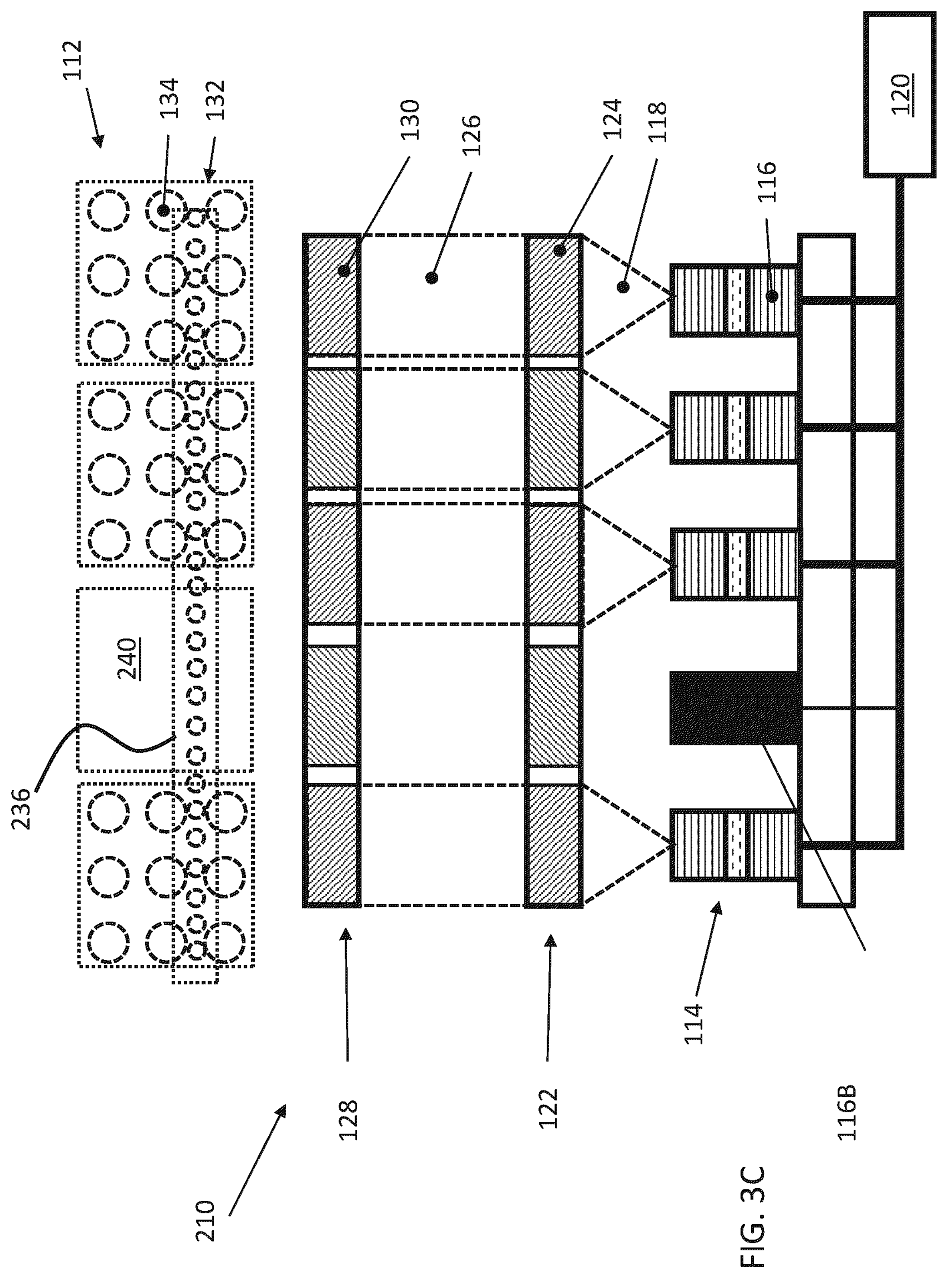

FIGS. 3A-3C depict another example structured light generating module 210 similar to the example described in connection with FIGS. 2A-2C. The example depicted in FIG. 3A-3C, however, includes a supplemental light source 216A and corresponding supplemental collimator element 224A and corresponding supplemental fanout element 230A (all respectively aligned to each other) configured to generate a patch structured light illumination 236 (see FIG. 3C). In this example, the patch structured light illumination 236 is configured to extend over more than one unit-cell structured light illumination 132 such that deficient object data corresponding to any void (e.g., 240 in FIG. 3B) in the structured light illumination 112 (e.g., caused by a non-functioning light source 116B) can be more easily interpolated from the patch structured light illumination 236 and any unit-cell structured light illuminations in close proximity (e.g., immediately adjacent) the void 240.

Figures 4A, 4B:
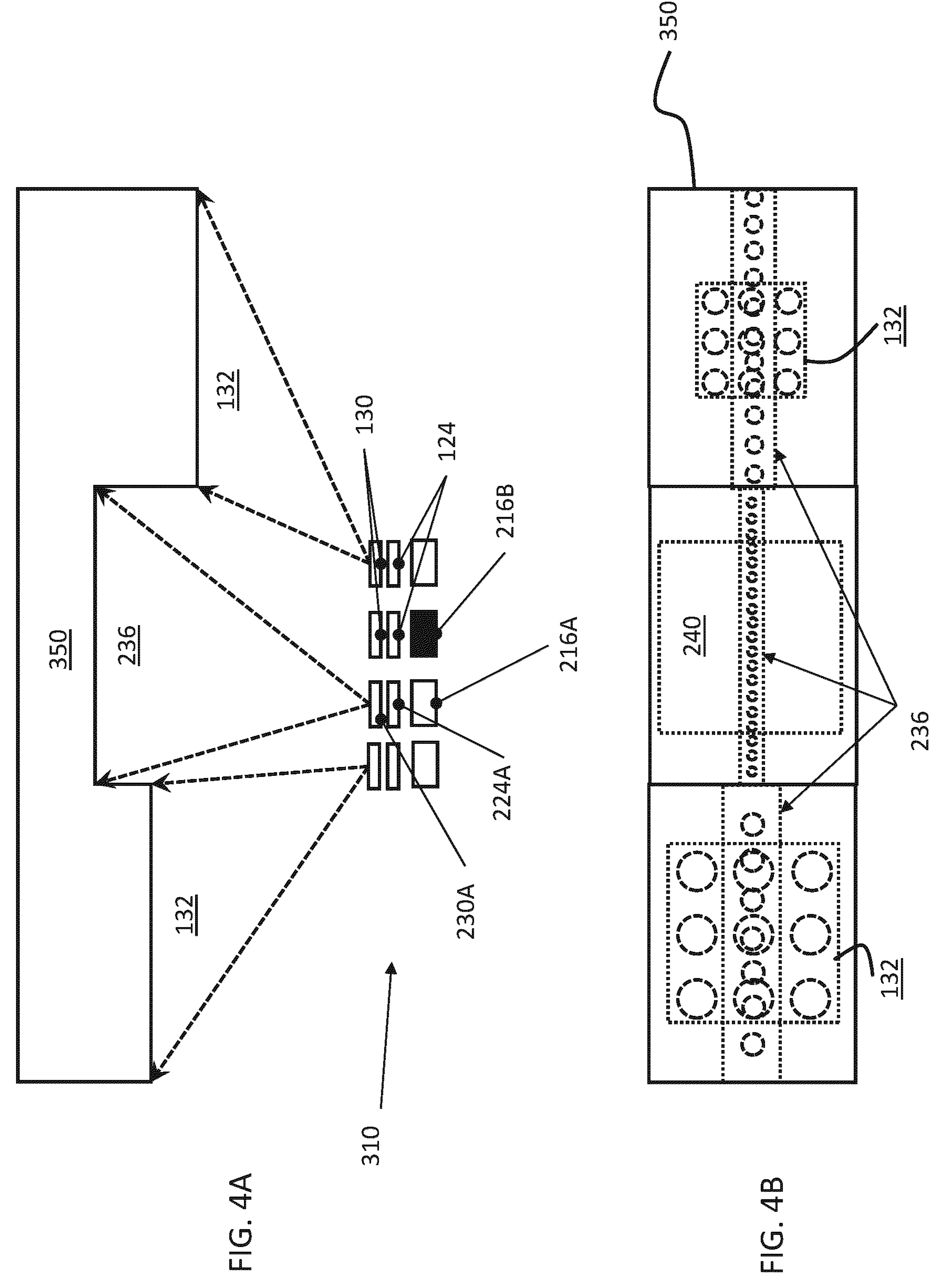
FIGS. 4A-4B depicts still yet another example structured light illumination module.

FIGS. 4A-4B depicts another example structured light illumination module 310. The example structured light illumination module 310 is similar to the structured light illumination module depicted in FIGS. 3A-3C and is depicted adjacent to an object 350 with different portions of the object located at different distances from the structured light illumination module 310. FIG. 4A depicts a top view of the object 350, and FIG. 4B depicts a side view of the object 350. FIG. 4A-4B illustrate an example of how the patch illumination 236 can be modified by the different portions of the object 350 that are located at different distances from the structure light illumination module 310.

In some implementations, a supplemental light source, corresponding supplemental collimator element, and corresponding supplemental fanout element need not be employed to mitigate voids in the structured light illumination. For example, the structured light illumination module may be used to capture object data at a first position, and then moved to capture object data at a second position. The two sets of data can be stitched or overlayed to mitigate any voids in the structured light illumination. This approach may be preferable to other approaches, for example, where structured light illumination modules employ supplemental light sources and optics. Such approaches may require larger footprints (i.e., larger arrays of light sources). Moreover, the focal length (and corresponding total track length) of optics integrated into such structured light illumination modules also may be larger.

Various modifications will be apparent from the foregoing detailed description. Further, features described above in connection with different implementations may, in some cases, be combined in the same implementation. Accordingly, other implementations also are within the scope of the claims.

What is claimed is:

1. A structured light generating module comprising;

an array of discrete light sources, an array of discrete fanout elements, and an array of discrete collimator elements interposed between the array of discrete light sources and the array of discrete fanout elements, each of the discrete collimator elements within the array of discrete collimator elements being aligned to a respective discrete light source within the array of discrete light sources, each of the fanout elements within the array of discrete fanout elements being aligned to a respective discrete collimator element within the array of discrete collimator elements, and each of the respectively aligned discrete light sources, collimator elements, and fanout elements being configured to generate a unit-cell structured light illumination comprising a plurality of individual illumination features over at least a portion of a field of illumination of the structured light generating module, one or more of the unit-cell structured light illuminations collectively being a structured light illumination.

2. The structured light generating module of claim 1, wherein each of the discrete collimator elements is at least one of a diffractive optical element or a meta-optical element.

3. The structured light generating module of claim 2, wherein each of the discrete fanout elements is at least one of a diffractive optical element or a meta-optical element configured to generate one or more diffraction orders corresponding to one or more individual illuminations within the unit-cell structured light illumination.

4. The structured light generating module of claim 3, wherein the structured light generating module is configured to regulate power to one or more of the discrete light sources within the array of light sources such that the structured light illumination only illuminates a portion of the field of illumination.

5. The structured light generating module of claim 3, wherein each discrete light source within the array of light sources is a vertical-cavity surface-emitting laser.

6. The structured light generating module of claim 5, wherein the structured light generating module further includes a supplemental light source, a supplemental fanout element, and a supplemental collimator element interposed between the supplemental light source and the supplemental fanout element, such that the supplemental collimator element is aligned to the supplemental light source, and the supplemental fanout element is aligned with the supplemental collimator element.

7. The structured light generating module of claim 6, wherein the respectively aligned supplemental light source, supplemental collimator element, and supplemental fanout element are configured to generate a supplemental structured light illumination comprising one or more individual illumination features over at least a portion of the field of illumination.

8. The structured light generating module of claim 3, wherein each discrete fanout element within the array of fanout elements is mounted on a common substrate or is composed of a same material as the other discrete fanout elements within the array of discrete fanout elements.

9. The structured light generating module of claim 8, wherein each discrete collimator element within the array of collimator elements is mounted on a common substrate or is composed of a same material as the other discrete collimator elements within the array of discrete collimator elements.

10. The structured light generating module of claim 1, wherein each of the discrete fanout elements is at least one of a diffractive optical element or a meta-optical element configured to generate one or more diffraction orders corresponding to one or more individual illuminations within the unit-cell structured light illumination.

11. The structured light generating module of claim 1, wherein the structured light generating module is configured to regulate power to one or more of the discrete light sources within the array of light sources such that the structured light illumination only illuminates a portion of the field of illumination.

12. The structured light generating module of claim 1, wherein each discrete light source within the array of light sources is a vertical-cavity surface-emitting laser.

13. The structured light generating module of claim 1, wherein the structured light generating module further includes a supplemental light source, a supplemental fanout element, and a supplemental collimator element interposed between the supplemental light source and the supplemental fanout element, such that the supplemental collimator element is aligned to the supplemental light source, and the supplemental fanout element is aligned with the supplemental collimator element.

14. The structured light generating module of claim 13, wherein the respectively aligned supplemental light source, supplemental collimator element, and supplemental fanout element are configured to generate a supplemental structured light illumination comprising one or more individual illumination features over at least a portion of the field of illumination.

15. The structured light generating module of claim 1, wherein each discrete fanout element within the array of fanout elements is mounted on a common substrate or is composed of a same material as the other discrete fanout elements within the array of discrete fanout elements.

16. The structured light generating module of claim 1, wherein each discrete collimator element within the array of collimator elements is mounted on a common substrate or is composed of a same material as the other discrete collimator elements within the array of discrete collimator elements.

17. A system comprising:

a structured light generating module according to claim 1; and an array of light-sensitive components, the system being configured to collect light reflected from an object illuminated by the structured light illumination.

18. The system of claim 17 configured to regulate power to one or more of the discrete light sources within the array of light sources such that the structured light illumination only illuminates the object within the field of illumination.

19. The structured light generating module of claim 1, wherein each of the discrete fanout elements is a meta-optical element configured to generate one or more diffraction orders corresponding to one or more individual illuminations within the unit-cell structured light illumination.

20. The structured light generating module of claim 19, wherein the structured light generating module is configured to regulate power to one or more of the discrete light sources within the array of light sources such that the structured light illumination only illuminates a portion of the field of illumination.

* * * * *